US011043673B2

(12) United States Patent
Choi et al.

(10) Patent No.: US 11,043,673 B2
(45) Date of Patent: Jun. 22, 2021

(54) ANODE ACTIVE MATERIAL FOR LITHIUM SECONDARY BATTERY AND LITHIUM SECONDARY BATTERY COMPRISING SAME

(71) Applicant: SAMSUNG SDI CO., LTD., Yongin-si (KR)

(72) Inventors: Hee Seon Choi, Yongin-si (KR); Sangpil Kim, Yongin-si (KR); Youngugk Kim, Yongin-si (KR); Jiyeon Kwak, Yongin-si (KR); Yeongap Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 76 days.

(21) Appl. No.: 16/479,193

(22) PCT Filed: Jan. 17, 2018

(86) PCT No.: PCT/KR2018/000778
§ 371 (c)(1),
(2) Date: Jul. 18, 2019

(87) PCT Pub. No.: WO2018/135848
PCT Pub. Date: Jul. 26, 2018

(65) Prior Publication Data
US 2019/0386307 A1  Dec. 19, 2019

(30) Foreign Application Priority Data
Jan. 20, 2017  (KR) .................. 10-2017-0009624

(51) Int. Cl.
*H01M 10/05* (2010.01)
*H01M 4/583* (2010.01)
(Continued)

(52) U.S. Cl.
CPC ......... *H01M 4/5835* (2013.01); *H01M 10/05* (2013.01); *H01M 4/133* (2013.01);
(Continued)

(58) Field of Classification Search
None
See application file for complete search history.

(56) References Cited

U.S. PATENT DOCUMENTS

2004/0048160 A1*  3/2004 Omaru ................. H01M 4/621
429/231.4
2004/0170898 A1  9/2004 Shibuya et al.
(Continued)

FOREIGN PATENT DOCUMENTS

JP  2010-176973 A  8/2010
JP  2015-220173 A  12/2015
(Continued)

*Primary Examiner* — Lisa S Park
(74) *Attorney, Agent, or Firm* — Lewis Roca Rothgerber Christie LLP (57) ABSTRACT

Provided are an anode active material for a lithium secondary battery and a lithium secondary battery comprising the same, wherein the anode active material comprises at least three types of spherical graphite, and a difference between a 90% volume cumulative diameter ($D_{90}$) and a 10% volume cumulative diameter ($D_{10}$) is in the range of 13.0 μm≤($D_{90}$−$D_{10}$)≤35.0 μm.

11 Claims, 4 Drawing Sheets

(51) Int. Cl.
   *H01M 4/133* (2010.01)
   *H01M 4/02* (2006.01)
   *H01M 4/587* (2010.01)
   *H01M 4/36* (2006.01)

(52) U.S. Cl.
   CPC ............ *H01M 4/364* (2013.01); *H01M 4/587* (2013.01); *H01M 2004/027* (2013.01); *Y02E 60/10* (2013.01)

(56) References Cited

U.S. PATENT DOCUMENTS

| | | | |
|---|---|---|---|
| 2008/0113271 A1* | 5/2008 | Ueda | ................... H01M 4/1395 429/231.95 |
| 2010/0297500 A1 | 11/2010 | Kawai et al. | |
| 2014/0080004 A1 | 3/2014 | Imaji et al. | |
| 2014/0287316 A1 | 9/2014 | Ahn et al. | |
| 2016/0268591 A1 | 9/2016 | Choi et al. | |
| 2017/0309892 A1* | 10/2017 | Koike | ..................... B60L 50/14 |

FOREIGN PATENT DOCUMENTS

| | | | |
|---|---|---|---|
| KR | 10-2004-0087858 A | 10/2004 | |
| KR | 10-2009-0016462 A | 2/2009 | |
| KR | 10-2013-0124584 A | 11/2013 | |
| KR | 10-2014-0095980 A | 8/2014 | |
| KR | 10-2014-0147240 A | 12/2014 | |
| KR | 10-2015-0070971 A | 6/2015 | |
| KR | 10-2015-0089209 A | 8/2015 | |
| KR | 10-2016-0109946 A | 9/2016 | |
| KR | 10-2017-0007140 A | 1/2017 | |

\* cited by examiner

ANODE ACTIVE MATERIAL FOR LITHIUM SECONDARY BATTERY AND LITHIUM SECONDARY BATTERY COMPRISING SAME

CROSS-REFERENCE TO RELATED APPLICATION(S)

This application is a National Phase Patent Application and claims priority to and the benefit of International Application Number PCT/KR2018/000778, filed on Jan. 17, 2018, which claims priority to Korean Patent Application Number 10-2017-0009624, filed on Jan. 20, 2017, the entire contents of all of which are incorporated herein by reference.

TECHNICAL FIELD

This disclosure relates to an anode active material for a lithium secondary battery and a lithium secondary battery including the same.

BACKGROUND ART

A lithium secondary battery has recently drawn attention as a power source for small portable electronic devices and it uses an organic electrolyte solution and thereby, has twice as high discharge voltage as a conventional battery using an alkali aqueous solution and accordingly, has a high energy density.

A lithium secondary battery includes a cathode, an anode, a separator interposed between the cathode and the anode and an electrolyte solution, and the cathode and the anode include a current collector and an active material layer.

As for cathode active materials of the cathode, an oxide composed of lithium and a transition metal having a structure capable of intercalating lithium, such as $LiCoO_2$, $LiMn_2O_4$, $LiNi_{1-x}Co_xO_2$ (0<X<1), and the like may be used.

As for anode active materials of the anode, various carbon-based materials such as artificial graphite, natural graphite, and hard carbon that may intercalate and deintercalate have been used, and a mixture of a Si-based material and a carbon-based material may be used.

DISCLOSURE

An embodiment of the present invention provides an anode active material for a lithium secondary battery by decreasing expansion of the anode active material during charge and discharge of the lithium secondary battery and thus, suppressing deformation of the battery even having a high density electrode and improving its cycle-life.

Another embodiment of the present invention provides a lithium secondary battery including the anode active material.

An anode active material for a lithium secondary battery according to an embodiment of the present invention includes at least three types of spherical graphite, wherein a difference between a 90% volume cumulative diameter ($D_{90}$) and a 10% volume cumulative diameter ($D_{10}$) is in the range of 13.0 µm≤($D_{90}$–$D_{10}$)≤35.0 µm.

In the anode active material, a difference between a 90% volume cumulative diameter ($D_{90}$) and a 10% volume cumulative diameter ($D_{10}$) relative to a sum of 10% volume cumulative diameter ($D_{10}$), 50% volume cumulative diameter ($D_{50}$), and 90% volume cumulative diameter ($D_{90}$) may be in the range of 0.30≤($D_{90}$–$D_{10}$)/($D_{10}$+$D_{50}$+$D_{90}$)≤0.60.

The spherical graphite may include coarse-grained spherical graphite having an average particle diameter of 17.0 µm to 20.0 µm; medium-grained spherical graphite having an average particle diameter of 11.0 µm to 13.0 µm; and fine-grained spherical graphite having an average particle diameter of 3.0 µm to 4.0 µm.

A ratio of the average particle diameter of the medium-grained spherical graphite relative to the average particle diameter of the coarse-grained spherical graphite may be 0.5 to 0.8.

A ratio of the average particle diameter of the fine-grained spherical graphite relative to the average particle diameter of the coarse-grained spherical graphite may be 0.15 to 0.3.

A circularity of the coarse-grained spherical graphite may be 0.6 to 0.9, a circularity of the medium-grained spherical graphite may be 0.7 to 0.99, and a circularity of the fine-grained spherical graphite may be 0.6 to 0.9.

The fine-grained spherical graphite may be included in an amount of 10 to 60 parts by weight based on 100 parts by weight of the medium-grained spherical graphite.

The fine-grained spherical graphite may be included in an amount of 5 to 20 parts by weight based on 100 parts by weight of the coarse-grained spherical graphite.

The medium-grained spherical graphite and the coarse-grained spherical graphite may be included in a weight ratio of 1:10 to 6:4.

An orientation degree (I(002)/I(110)) of the anode active material for a lithium secondary battery according to the embodiment of the present invention may be 160 to 180.

Another embodiment of the present invention provides a lithium secondary battery including an anode including the anode active material; a cathode including a cathode active material; and a non-aqueous electrolyte.

The anode active material for a lithium secondary battery according to an embodiment of the present invention includes at least three types of spherical graphite with different particle characteristics (average particle diameter, particle shape, etc.), thereby a volume expansion of the anode active material may be suppressed during charge and discharge of a lithium secondary battery, resultantly battery deformation may be prevented, and a battery having improved cycle-life characteristics may be provided.

DESCRIPTION OF SYMBOLS

1: lithium secondary battery
2: cathode
3: anode
4: separator
5: battery case
6: sealing member

MODE FOR INVENTION

Hereinafter, embodiments of the present invention are described in detail. However, these embodiments are exemplary, the present invention is not limited thereto and the present invention is defined by the scope of claims.

An anode active material for a lithium secondary battery according to an embodiment of the present invention includes at least three types of spherical graphite, wherein a difference between a 90% volume cumulative diameter ($D_{90}$) and a 10% volume cumulative diameter ($D_{10}$) is in the range of 13.0 µm≤($D_{90}$–$D_{10}$)≤35.0 µm.

In an embodiment of the present invention, a difference between the 90% volume cumulative diameter $D_{90}$ and the 10% volume cumulative diameter $D_{10}$ may be in a range of 13.0 µm≤($D_{90}$–$D_{10}$)≤30.0 µm, for example 13.0 µm≤($D_{90}$–$D_{10}$)≤28.0 µm.

When included in the ranges, expansion of the anode active material during the charge and discharge of a lithium secondary battery may be suppressed.

In the present specification, $D_{10}$, $D_{50}$, and $D_{90}$ respectively indicate particle sizes corresponding to 10 volume %, 50 volume %, and 90 volume % with respect to the largest value in each particle distribution.

In other words, when particles are cumulatively distributed in order from a smallest size, a particle diameter at a particle cumulative volume of 10 volume % is $D_{10}$, a particle diameter at a particle cumulative volume of 50 volume % is $D_{50}$, and a particle diameter at a particle cumulative volume of 90 volume % is $D_{90}$.

A particle distribution measurement of graphite used for an anode active material is performed by sufficiently dispersing the anode active material in water with an ultrasonic wave and then, obtaining the 10% volume cumulative diameter ($D_{10}$), the 50% volume cumulative diameter (D50), and the 90% volume cumulative diameter ($D_{90}$) with a laser diffraction-type particle distribution-measuring device (Microtrac, Nikkiso Co., Ltd.).

The anode active material may have a difference between a 90% volume cumulative diameter ($D_{90}$) and a 10% volume cumulative diameter ($D_{10}$) relative to a sum of 10% volume cumulative diameter ($D_{10}$), 50% volume cumulative diameter ($D_{50}$), and 90% volume cumulative diameter ($D_{90}$) within the range of 0.30≤($D_{90}$–$D_{10}$)/($D_{10}$+$D_{50}$+$D_{90}$)≤0.60, for example 0.30≤($D_{90}$–$D_{10}$)/($D_{10}$+$D_{50}$+$D_{90}$)≤0.55.

When they are included within the ranges, the graphite powders maintain optimal polydispersity even at high density electrodes, thus suppressing the expansion of the anode active material during charge and discharge of a lithium secondary battery.

The spherical graphite may include coarse-grained spherical graphite having an average particle diameter of 17.0 µm to 20.0 µm; medium-grained spherical graphite having an average particle diameter of 11.0 µm to 13.0 µm; and fine-grained spherical graphite having an average particle diameter of 3.0 µm to 4.0 µm.

In the present specification, spherical graphite having a relatively large size with an average particle diameter of 17.0 µm to 20.0 µm is referred to as coarse-grained spherical graphite, spherical spherical graphite having relatively small size with an average particle diameter of 3.0 µm to 4.0 µm is referred to as fine-grained spherical graphite, and spherical graphite having a relatively small size compared with the coarse-grained spherical graphite and a relatively large size compared with fine-grained spherical graphite with an average particle diameter of 11.0 µm to 13.0 µm is referred to as medium-grained spherical graphite.

A ratio of the average particle diameter of the medium-grained spherical graphite relative to the average particle diameter of the coarse-grained spherical graphite may be 0.5 to 0.8.

A ratio of the average particle diameter of the fine-grained spherical graphite relative to the average particle diameter of the coarse-grained spherical graphite may be 0.15 to 0.3.

A circularity of the coarse-grained spherical graphite may be 0.6 to 0.9, a circularity of the medium-grained spherical graphite may be 0.7 to 0.99, and circularity of the fine-grained spherical graphite may be 0.6 to 0.9.

In the present specification, when a particle is projected onto a plane, the circularity is obtained as a length ratio 1/L of 1 (a major axis)/L (a minor axis) of a circle which has the same area as a projected image of the particle, and as the ratio 1/L is closer to 1, the circularity is higher.

In an embodiment of the present invention, the circularity is provided by measuring a particle size at each cumulative volume of 10%, 50%, and 90%, and mainly, as a central value D (n, 0.5) at the cumulative volume of 50% is closer to 1, the circularity is higher.

Circularity of spherical graphite according to an embodiment of the present invention is shown in Table 1.

TABLE 1

| Types of spherical graphite | Trade name | D (n, 0.1) | D (n, 0.5) | D (n, 0.9) |
|---|---|---|---|---|
| medium-grained | MC20 | 0.702 | 0.905 | 0.975 |
| coarse-grained | S360MB | 0.679 | 0.881 | 0.969 |
|  | H3P | 0.680 | 0.892 | 0.969 |
| fine-grained | CNG3 | 0.618 | 0.860 | 0.969 |

Referring to Table 1, S360 MB exhibits lower circularity than MC20, medium-grained spherical graphite as isotropic graphite manufactured through aggregation, and CNG3 exhibits the lowest circularity as sheet-shaped graphite.

The anode active material according to an embodiment of the present invention may have isotropy. A degree of the isotropy may be compared by using I(002)/I(110) indicating an orientation degree, and herein, as this value is lower, the orientation degree is higher.

Herein, the $I_{002}$ and $I_{110}$ respectively indicates each height of a (002) peak and a (110) peak.

The orientation degree of the anode active material according to an embodiment of the present invention is shown in Table 2.

TABLE 2

| Samples | Orientation degree I(002)/I(110) |
|---|---|
| Ref (MC20:MC08 = 5:5) | 264 |
| Example 4 | 180 |
| Example 6 | 161 |

Referring to Table 2, an orientation degree according to specific examples may be in a range of 160 to 180, which is lower than that of reference sample, and accordingly, isotropy thereof is high.

On the other hand, the medium-grained spherical graphite and the fine-grained spherical graphite according to an embodiment of the present invention respectively exhibit an orientation degree I(002)/I(110) in each range of 250 to 270 and 240 to 260 and thus, may be anisotropic, while the coarse-grained spherical graphite according to an embodiment of the present invention has an orientation degree I(002)/I(110) in a range of 150 to 185 and thus, may be isotropic. In a specific examples, the orientation degree I(002)/I(110) may be in a range of 170 to 185 with reference to H3P and in a range of 150 to 165 with reference to S360 MB.

This isotropic coarse-grained spherical graphite plays a role of being a sort of a support in the anode active material and thereby prevents an orientation thereof in a surface direction of a current collector and accordingly, may improve cycle-life characteristics due to a relatively small change of the orientation degree after the compression.

Figure 2:
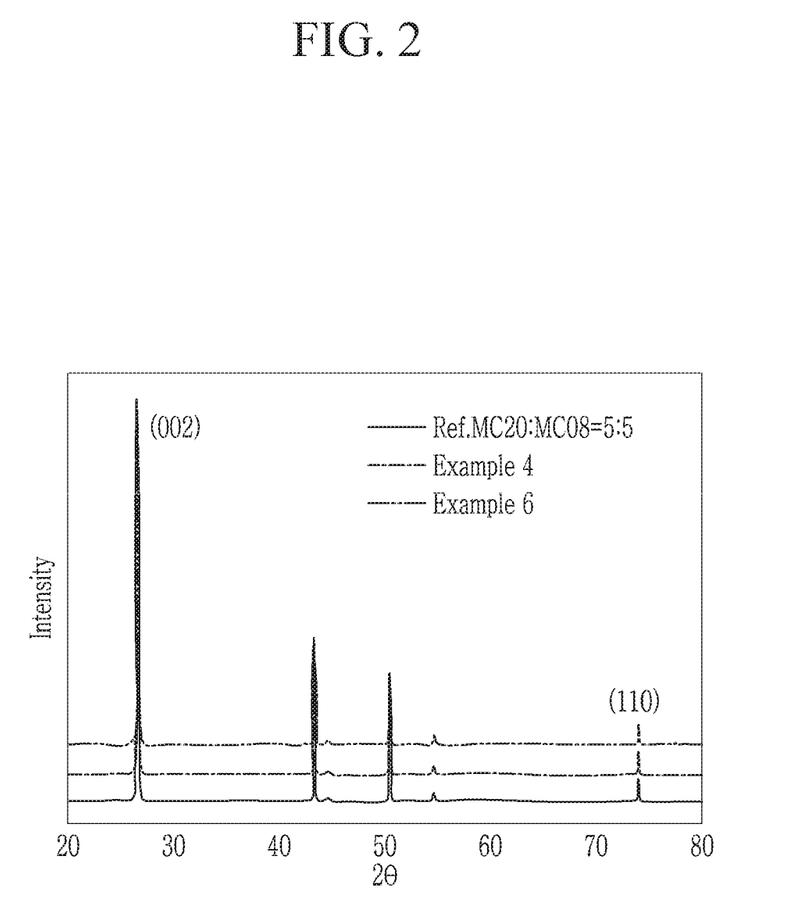
FIG. 2 is a graph showing XRD spectrum of the anode active material according to one example.

An XRD spectrum of the anode active material according to one example of the present invention is shown in FIG. 2.

Referring to FIG. 2, a (002) peak is clearly shown in each XRD spectrum, and a (110) peak is distinguished therefrom. Particularly, since (110) peak intensities of examples are higher than that of reference sample, orientation degrees of examples are much higher.

The fine-grained spherical graphite may be included in an amount of 10 to 60 parts by weight based on 100 parts by weight of the medium-grained spherical graphite.

The fine-grained spherical graphite may be included in an amount of 5 to 20 parts by weight based on 100 parts by weight of the coarse-grained spherical graphite.

The medium-grained spherical graphite and the coarse-grained spherical graphite may be included in a weight ratio of 1:10 to 6:4.

When the coarse-grained spherical graphite, the medium-grained spherical graphite, and the fine-grained spherical graphite are included in the ranges, each spherical graphite dispersed in the anode active material may have optimal polydispersity versus packing density and thus cycle-life characteristics of a battery may be improved.

Another embodiment of the present invention provides a lithium secondary battery including a cathode including a cathode active material, an anode including the anode active material, and an electrolyte.

The cathode includes a current collector and a cathode active material layer formed on the current collector and including a cathode active material. The cathode active material may be a compound (lithiated intercalation compound) being capable of intercalating and deintercallating lithium, and specifically one or more composite oxides of a metal selected from cobalt, manganese, nickel, and a combination thereof, and lithium. More specific examples may be compounds represented by one of the following chemical formulae. $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0 \leq b \leq 0.5$, $0 \leq c \leq 0.05$); $Li_aE_{2-b}X_bO_{4-c}D_c$ ($0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.5$, $0 < \alpha \leq 2$); $Li_aNi_{1-b-c}CO_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}CO_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCO_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); $Li_aFePO_4$ ($0.90 \leq a \leq 1.8$).

In the chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a cathode active material by using these elements in the compound. For example, the method may include any coating method such as spray coating, dipping, and the like, but is not illustrated in more detail since it is well-known in the related field.

In the cathode, a content of the cathode active material may be 90 wt % to 98 wt % based on the total weight of the cathode active material layer.

In an embodiment of the present invention, the cathode active material layer may further include a binder and a conductive material. Herein, each amount of the binder and the conductive material may be 1 wt % to 5 wt % based on the total weight of the cathode active material layer.

The binder improves binding properties of cathode active material particles with one another and with a current collector and examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to provide electrode conductivity and any electrically conductive material may be used as a conductive material unless it causes a chemical change. Examples of the conductive material may include a carbon-based material such as natural graphite, artificial graphite, carbon black, acetylene black, ketjen black, carbon fiber and the like, a metal-based material of a metal powder or a metal fiber including copper, nickel, aluminum, silver, and the like, a conductive polymer such as a polyphenylene derivative; or a mixture thereof.

The current collector may include an aluminum foil, a nickel foil, or a combination thereof, but is not limited thereto.

The anode includes a current collector and an anode active material layer including the anode active material formed on the current collector.

In the anode active material layer, the anode active material may be included in an amount of 95 wt % to 99 wt % based on the total weight of the anode active material layer.

In an embodiment of the present invention, the anode active material layer may further include a binder, and optionally a conductive material. Herein, each amount of the binder and the conductive material may be 1 wt % to 5 wt % based on a total weight of the anode active material layer. When the anode active material layer further includes a conductive material, the anode active material layer includes 90 wt % to 98 wt % of the anode active material, 1 wt % to 5 wt % of the binder, and 1 wt % to 5 wt % of the conductive material.

The binder improves binding properties of anode active material particles with one another and with a current collector. The binder includes a non-aqueous binder, an aqueous binder, or a combination thereof.

The non-aqueous binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The aqueous binder may be a styrene-butadiene rubber, an acrylated styrene-butadiene rubber (SBR), an acrylonitrile-butadiene rubber, an acrylic rubber, a butyl rubber, a fluorine rubber, an ethylenepropylene copolymer, polyepichlorohydrine, polyphosphazene, polyacrylonitrile, polystyrene, ethylenepropylenedienecopolymer, polyvinylpyridine, chlorosulfonated polyethylene, a latex, a polyester resin, an acrylic resin, a phenolic resin, an epoxy resin, polyvinyl alcohol, or a combination thereof.

When the aqueous binder is used as the anode binder, a cellulose-based compound may be further used to provide viscosity as a thickener. The cellulose-based compound includes one or more of carboxylmethyl cellulose, hydroxypropylmethyl cellulose, methyl cellulose, or alkali metal salts thereof. The alkali metal may be Na, K, or Li. Such a thickener may be included in an amount of 0.1 to 3 parts by weight based on 100 parts by weight of the anode active material.

The conductive material is included to provide electrode conductivity and any electrically conductive material may be used as a conductive material unless it causes a chemical change. Examples of the conductive material include a carbon-based material such as natural graphite, artificial graphite, carbon black, acetylene black, ketjen black, a carbon fiber, and the like, a metal-based material of a metal powder or a metal fiber including copper, nickel, aluminum, silver, and the like, a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethylacetate, methylpropionate, ethylpropionate, decanolide, mevalonolactone, caprolactone, and the like. The ether-based solvent may include dibutyl ether, tetraglyme, diglyme, dimethoxyethane, 2-methyltetrahydrofuran, tetrahydrofuran, and the like. The ketone-based solvent includes cyclohexanone and the like. The alcohol-based solvent include ethyl alcohol, isopropyl alcohol, and the like, and examples of the aprotic solvent include nitriles such as R—CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

The organic solvent may be used alone or in a mixture. When the organic solvent is used in a mixture, the mixture ratio may be controlled in accordance with a desirable battery performance.

In addition, the carbonate-based solvent may include a mixture of a cyclic carbonate and a chain-type carbonate. In this case, when the cyclic carbonate and the chain-type carbonate are mixed together in a volume ratio of 1:1 to 1:9, performance of an electrolyte may be enhanced.

The organic solvent may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 1.

[Chemical Formula 1]

In Chemical Formula 1, $R_1$ to $R_6$ are the same or different and are selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound of Chemical Formula 2 in order to improve cycle life of a battery as a cycle-life improvement additive.

[Chemical Formula 2]

In Chemical Formula 2, $R_7$ and $R_8$ are the same or different and selected from hydrogen, a halogen, a cyano group (CN), a nitro group ($NO_2$), and a fluorinated C1 to C5 alkyl group, provided that at least one of $R_7$ and $R_8$ is selected from a halogen, a cyano group (CN), a nitro group ($NO_2$), and fluorinated C1 to C5 alkyl group, and $R_7$ and $R_8$ are not simultaneously hydrogen.

Examples of the ethylene carbonate-based compound may be difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate, and the like. The amount of the additive for improving cycle life may be used within an appropriate range.

The lithium salt dissolved in an organic solvent supplies a battery with lithium ions, basically operates the lithium secondary battery, and improves transportation of the lithium ions between a cathode and an anode. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, for example an integer ranging from 1 to 20), LiCl, LiI, and $LiB(C_2O_4)_2$ (lithium bis (oxalato) borate: LiBOB). A concentration of the lithium salt may range from 0.1 M to 2.0 M. When the lithium salt is included at the above concentration range, an electrolyte may have excellent performance and lithium ion mobility due to optimal electrolyte conductivity and viscosity.

The lithium secondary battery may further include a separator between the anode and the cathode, depending on a kind of the battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Figure 1:
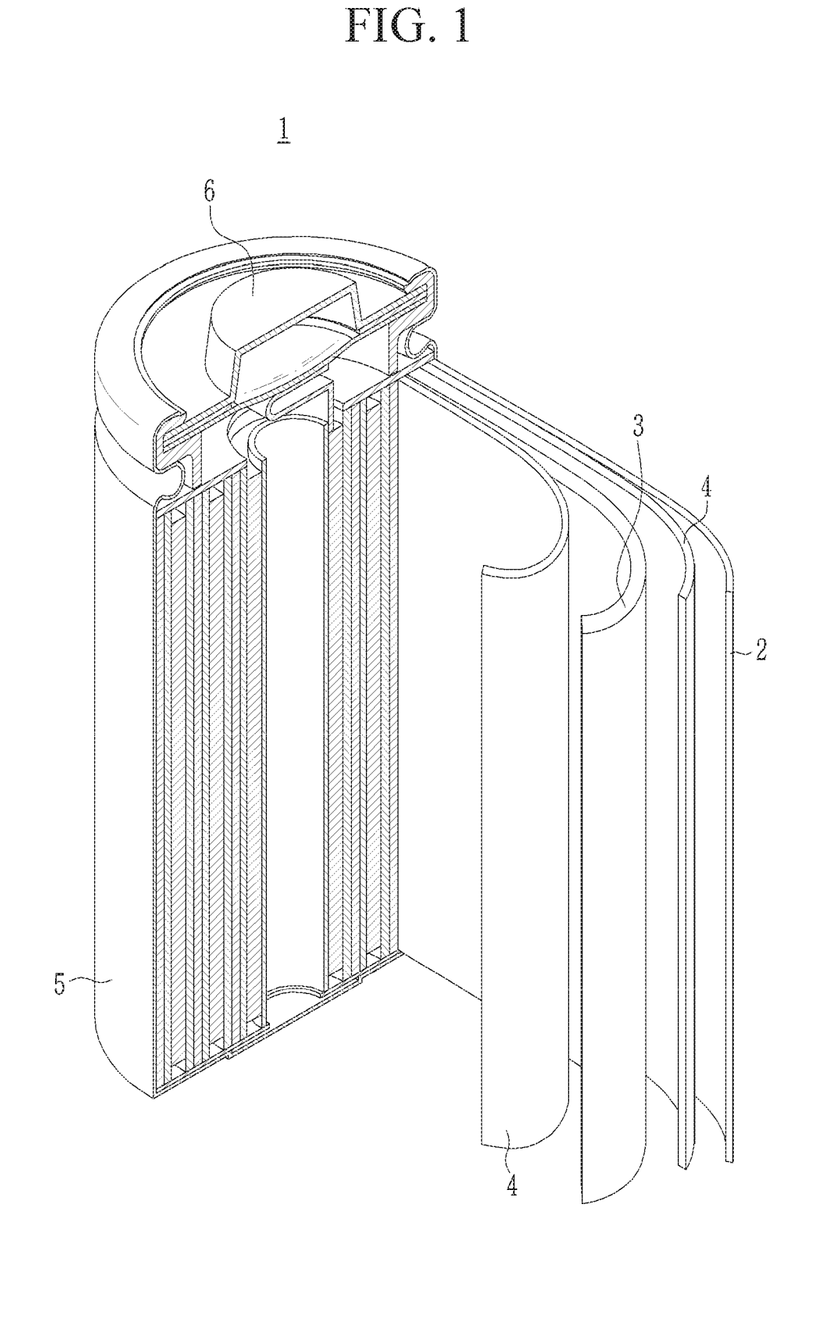
FIG. 1 shows a lithium secondary battery according to an embodiment of the present invention.

FIG. 1 is a schematic view showing a structure of a lithium secondary battery according to an embodiment. As shown in FIG. 1 the lithium secondary battery 1 includes a battery case 5 including a cathode 2, an anode 3, and a separator disposed between the cathode 2 and the anode 3, in which an electrolyte solution is impregnated, and a sealing member 6 sealing the battery case 5.

Hereinafter, examples of the present invention and comparative examples are described. These examples, however, are not in any sense to be interpreted as limiting the scope of the invention.

Manufacture of Anode

Examples 1 to 7

97 wt % of an anode active material, 1.5 wt % of a carboxyl methyl cellulose thickener, and 1.5 wt % of a styrene-butadiene rubber binder were uniformly mixed in pure water to prepare anode active material slurry having a solid content of 50 wt %. The anode active material was prepared to have a composition shown in Table 3.

The anode active material slurry was coated on a Cu foil current collector and then, dried and compressed to manufacture an anode.

Comparative Example 1

An anode was manufactured according to the same method as examples except that the medium-grained spherical graphite alone was used as an anode active material.

TABLE 3

| Composition (weight) | Sample 4 MC20 (medium-grained) | Sample 7 H3P (coarse-grained) | Sample 9 S360MB (coarse-grained) | Sample 10 CNG3 (fine-grained) |
|---|---|---|---|---|
| Example 1 | 56.4 | 37.6 | — | 6 |
| Example 2 | 37.6 | 56.4 | — | 6 |
| Example 3 | 28.2 | 65.8 | — | 6 |
| Example 4 | 18.8 | 75.2 | — | 6 |
| Example 5 | 28.5 | — | 66.5 | 5 |
| Example 6 | 19 | — | 76 | 5 |
| Example 7 | 9.5 | — | 85.5 | 5 |
| Comparative Example 1 | 100 | — | — | — |

Evaluation 1: Particle Size Analysis of Anode Active Material

The evaluation results of particle size characteristics of the anode active materials according to Examples 1 to 7 and Comparative Example 1 are shown in Table 4.

TABLE 4

| | $D_{10}$ | $D_{50}$ | $D_{90}$ | Polydispersity ($\sigma$) | Packing Density | Distribution ($D_{90} - D_{10}$) | $D_{90} - D_{10}$/ ($D_{10} + D_{50} + D_{90}$) |
|---|---|---|---|---|---|---|---|
| Example 1 | 6.61 | 12.00 | 19.72 | 0.43 | 1.38 | 13.11 | 0.34 |
| Example 2 | 6.91 | 12.80 | 21.31 | 0.44 | 1.39 | 14.39 | 0.35 |
| Example 3 | 7.07 | 13.24 | 22.13 | 0.45 | 1.40 | 15.05 | 0.35 |
| Example 4 | 7.32 | 13.69 | 22.77 | 0.44 | 1.39 | 15.45 | 0.35 |
| Example 5 | 5.59 | 13.08 | 27.80 | 0.63 | 1.45 | 22.22 | 0.48 |
| Example 6 | 5.57 | 13.73 | 30.42 | 0.67 | 1.46 | 24.85 | 0.50 |
| Example 7 | 5.63 | 14.52 | 33.51 | 0.70 | 1.49 | 27.88 | 0.52 |
| Comparative Example 1 | 8.70 | 12.70 | 19.30 | 0.32 | 1.37 | 10.60 | 0.26 |

Referring to Table 4, polydispersity ($\sigma$) of a particle size has a high correlation with a packing density of an active material. In other words, as a distribution ($D_{90}$–$D_{10}$) is larger, packing density tends to be higher (Examples 1 to 3 and Examples 4 to 7). This means that as the particle distribution is larger, the packing density increases. Particularly, when the coarse-grained graphite is mixed within an appropriate range, this tendency may be further maximized.

When graphite is applied in designing a lithium secondary battery, a volume expansion degree should be considered due to a structural change of the graphite according to a packing density, but if not considered, an electrode distortion phenomenon and the like due to an anode expansion during the charge may occur and thereby, greatly deteriorate a cycle-life and performance of a battery. However, as shown in examples of the present invention, when the packing density was increased, the structural change of graphite was reduced during the charge/discharge, and a region of generating byproducts with an electrolyte solution became narrow, and accordingly, an effect of reducing an electrode plate expansion might be expected.

Evaluation 2: Cycle-Life Characteristics

Each anode according to Examples 1 to 7 and Comparative Example 1, a cathode NCA as a counter electrode of the anode, and an electrolyte solution prepared by dissolving $LiPF_6$ at a concentration of 1.15 M in a mixed solution of ethylenecarbonate (EC), ethylmethylcarbonate (EMC), and dimethylcarbonate (DMC) in a volume ratio of 2:4:4 were used to manufacture 18650 mini cells.

Figure 3:
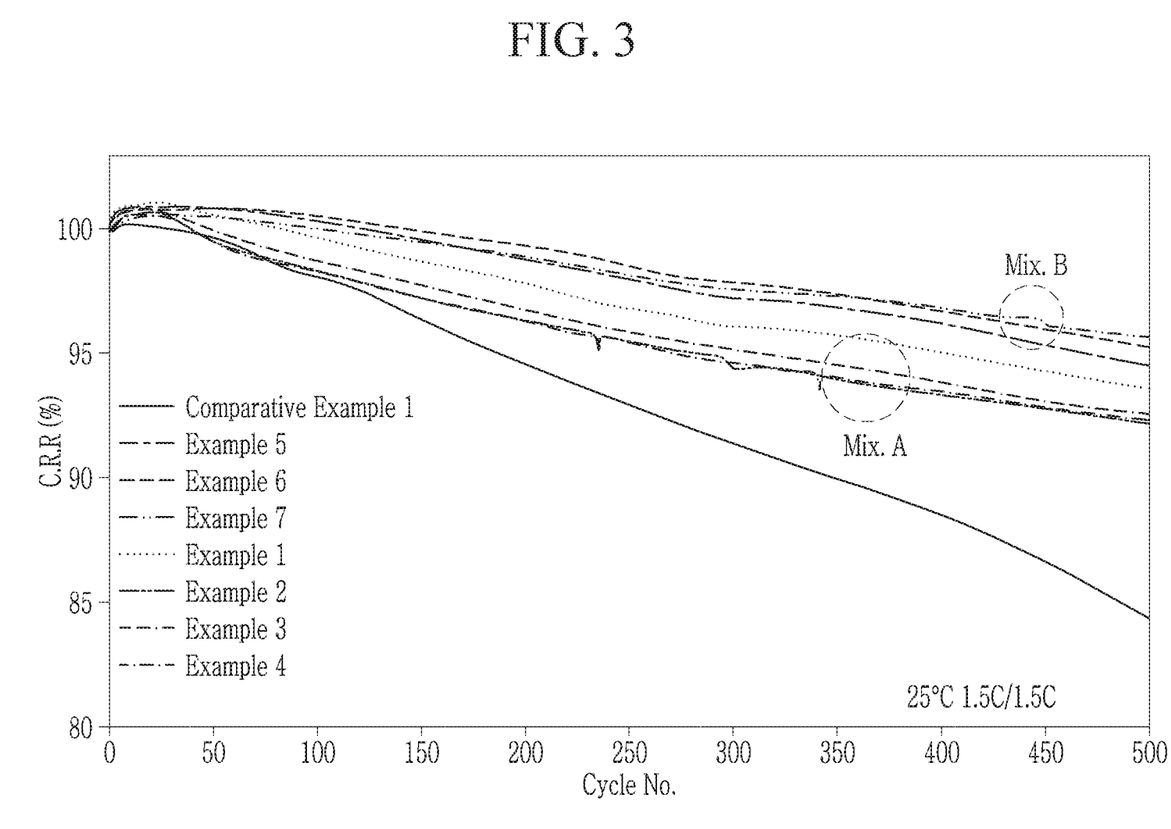
FIG. 3 is a graph showing the discharge capacity retention at 25° C. of lithium secondary battery cells using anodes of example and comparative example.
Figure 4:
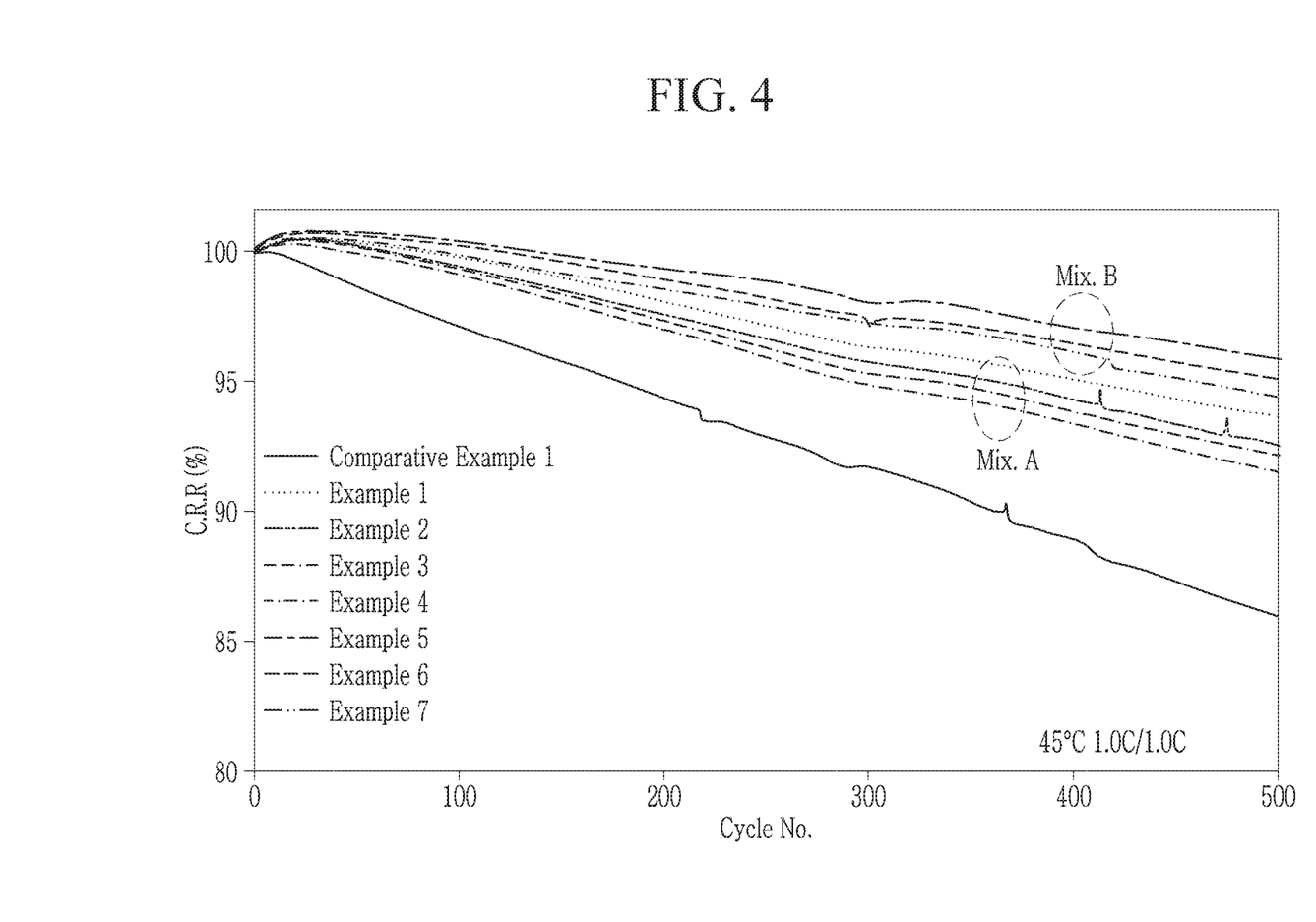
FIG. 4 is a graph showing the discharge capacity retention at 45° C. of lithium secondary battery cells using anodes of example and comparative example.

The half-cells were 500 times charged and discharged at 1 C at 25° C. and 45° C., and then, a capacity change thereof relative to an initial capacity was measured, and FIG. 3 shows data measured at 25° C., and FIG. 4 shows data measured at 45° C.

FIG. 3 is a graph showing capacity changes of the 18650 mini cells according to Examples 1 to 7 and Comparative Example 1 at 25° C. depending on charge and discharge cycles.

FIG. 4 is a graph showing capacity changes of the 18650 mini cells according to Examples 1 to 7 and Comparative Example 1 at 45° C. depending on the charge and discharge cycles.

Referring to FIGS. 3 and 4, the battery cells according to examples exhibited excellent capacity retentions and thereby, excellent cycle-life characteristics compared with those of the battery cell according to comparative example.

Evaluation 3: Expansion Rate

The half-cells according to Examples 1 to 7 and Comparative Example 1 were once charged at 0.2 C, and thicknesses of the cells before and after the charge were measured to obtain each thickness increase rate. The results are shown in Table 5 (25° C.) and Table 6 (45° C.).

TABLE 5

| 25° C. | Battery cell thickness before charging (μm) | Battery cell thickness after charging (μm) | Thickness increase rate (%) | Expansion improvement rate (%) |
|---|---|---|---|---|
| Example 1 | 89 | 104.56 | 19.21 | 7.46 |
| Example 2 | 89 | 100.88 | 14.67 | 12.00 |
| Example 3 | 89 | 103.62 | 18.05 | 8.62 |
| Example 4 | 89 | 105.14 | 19.92 | 6.75 |
| Example 5 | 89 | 105.50 | 20.37 | 6.30 |
| Example 6 | 89 | 102.81 | 17.07 | 9.60 |
| Example 7 | 89 | 102.38 | 16.51 | 10.16 |
| Comparative Example 1 | 89 | 110.60 | 26.67 | — |

TABLE 6

| 45° C. | Battery cell thickness before charging (μm) | Battery cell thickness after charging (μm) | Thickness increase rate (%) | Expansion improvement rate (%) |
|---|---|---|---|---|
| Example 1 | 89 | 105.50 | 20.37 | 8.49 |
| Example 2 | 89 | 102.72 | 16.93 | 11.93 |
| Example 3 | 89 | 104.43 | 19.04 | 9.82 |
| Example 4 | 89 | 104.13 | 18.67 | 10.19 |
| Example 5 | 89 | 101.86 | 15.87 | 12.99 |
| Example 6 | 89 | 101.00 | 14.81 | 14.05 |
| Example 7 | 89 | 100.16 | 13.78 | 15.08 |
| Comparative Example 1 | 89 | 112.38 | 28.86 | — |

In Table 5, the expansion improvement rate, based on the thickness increase rate of Example 1 before and after the charge and discharge, indicates a reducing value therefrom. In other words, 12% of the expansion improvement rate of Example 2 means that Example 2 exhibited 14.67% of a thickness increase rate, which is 4.54% lower than 19.21% of Example 1, and the expansion improvement rate of Comparative Example 1 means that Comparative Example 1 exhibited 26.67% of a thickness increase rate, which is 7.46% higher than 19.21% of Example 1. As shown in Table 5, lithium battery cells respectively using the anodes according to Examples 1 to 7 exhibited a low thickness expansion rate compared with that of Comparative Example 1. (at 25° C.)

While the present invention has been particularly shown and described with reference to exemplary embodiments thereof, it is to be understood that the invention is not limited to the disclosed exemplary embodiments. On the contrary, it is intended to cover various modifications and equivalent arrangements included within the spirit and scope of the appended claims.

The invention claimed is:

1. An anode active material for a lithium secondary battery, comprising:
    at least three sizes of spherical graphite,
    wherein a difference between a 90% volume cumulative diameter ($D_{90}$) and a 10% volume cumulative diameter ($D_{10}$) is in the range of 13.0 μm≤($D_{90}$–$D_{10}$)≤35.0 μm.

2. The anode active material of claim 1, wherein a difference between a 90% volume cumulative diameter ($D_{90}$) and a 10% volume cumulative diameter ($D_{10}$) relative to a sum of 10% volume cumulative diameter ($D_{10}$), 50% volume cumulative diameter ($D_{50}$), and 90% volume cumulative diameter ($D_{90}$) is 0.30≤($D_{90}$–$D_{10}$)/($D_{10}$+$D_{50}$+$D_{90}$) ≤0.60.

3. The anode active material of claim 1, wherein the spherical graphite comprises coarse-grained spherical graphite having an average particle diameter of 17.0 μm to 20.0 μm; medium-grained spherical graphite having an average particle diameter of 11.0 μm to 13.0 μm; and fine-grained spherical graphite having an average particle diameter of 3.0 μm to 4.0 μm.

4. The anode active material of claim 3, wherein a ratio of the average particle diameter of the medium-grained spherical graphite relative to the average particle diameter of the coarse-grained spherical graphite is 0.5 to 0.8.

5. The anode active material of claim 3, wherein a ratio of the average particle diameter of the fine-grained spherical graphite relative to the average particle diameter of the coarse-grained spherical graphite is 0.15 to 0.3.

6. The anode active material of claim 3, wherein a circularity of the coarse-grained spherical graphite is 0.6 to 0.9,
 a circularity of the medium-grained spherical graphite is 0.7 to 0.99, and
 a circularity of the fine-grained spherical graphite is 0.6 to 0.9.

7. The anode active material of claim 3, wherein the fine-grained spherical graphite is included in an amount of 10 to 60 parts by weight based on 100 parts by weight of the medium-grained spherical graphite.

8. The anode active material of claim 3, wherein the fine-grained spherical graphite is included in an amount of 5 to 20 parts by weight based on 100 parts by weight of the coarse-grained spherical graphite.

9. The anode active material of claim 3, wherein the medium-grained spherical graphite and the coarse-grained spherical graphite are included in a weight ratio of 1:10 to 6:4.

10. The anode active material of claim 1, wherein an orientation degree ($I(002)/I(110)$) of the anode active material is 160 to 180.

11. A lithium secondary battery, comprising:
 an anode comprising the anode active material of claim 1;
 a cathode including a cathode active material; and
 a non-aqueous electrolyte.

* * * * *